United States Patent [19]

Brown

[11] 4,088,212

[45] May 9, 1978

[54] ONE PIECE STAMPED CLUTCH HUB

[75] Inventor: William Lee Brown, Chicago, Ill.

[73] Assignee: Borg-Warner Corporation, Chicago, Ill.

[21] Appl. No.: 720,037

[22] Filed: Sep. 2, 1976

[51] Int. Cl.² ............................................. F16D 3/14
[52] U.S. Cl. .................................. 192/106.2; 64/27 C
[58] Field of Search ......................... 192/106.2, 106.1; 64/27 C

[56] References Cited

U.S. PATENT DOCUMENTS

| | | | |
|---|---|---|---|
| 2,210,074 | 8/1940 | Friedman | 192/106.2 |
| 3,256,967 | 6/1966 | Heid | 192/107 R |
| 3,373,855 | 3/1968 | Ericson | 192/106.2 |
| 3,799,309 | 3/1974 | Cook | 192/106.2 |

Primary Examiner—Benjamin W. Wyche
Attorney, Agent, or Firm—James A. Geppert

[57] ABSTRACT

A one-piece flanged clutch hub produced from flat sheet stock for utilization in a vibration damper type of driven member of a friction clutch assembly. The flanged hub is provided with a plurality of small projections formed from the flange portion on each side thereof close to the barrel of the hub to pilot other elements of the clutch assembly.

10 Claims, 7 Drawing Figures

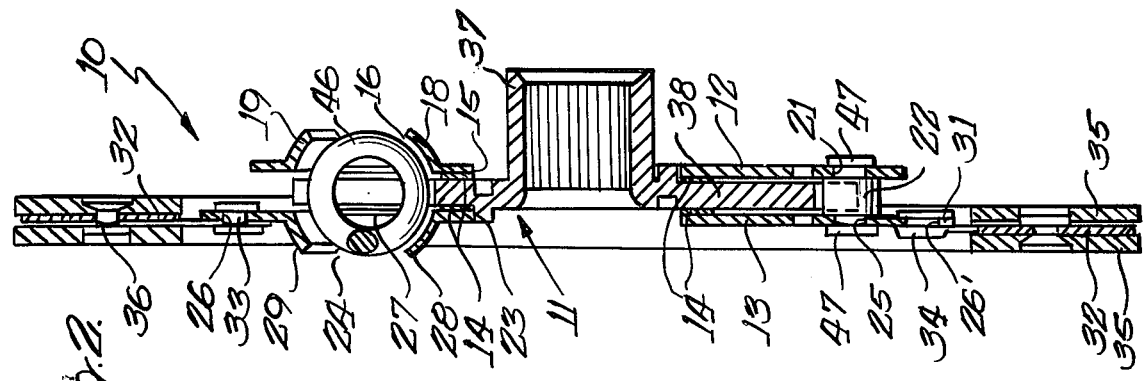
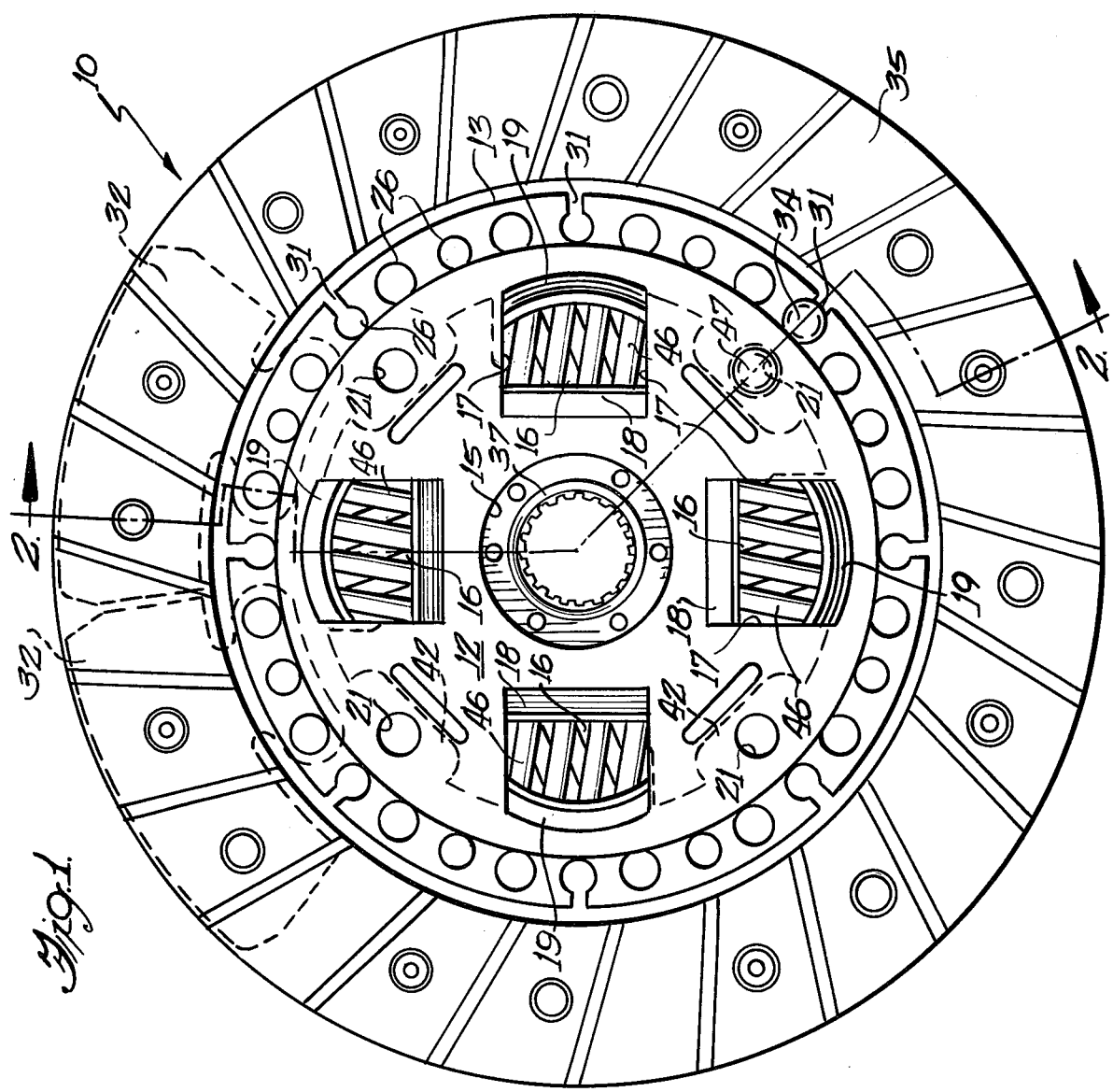

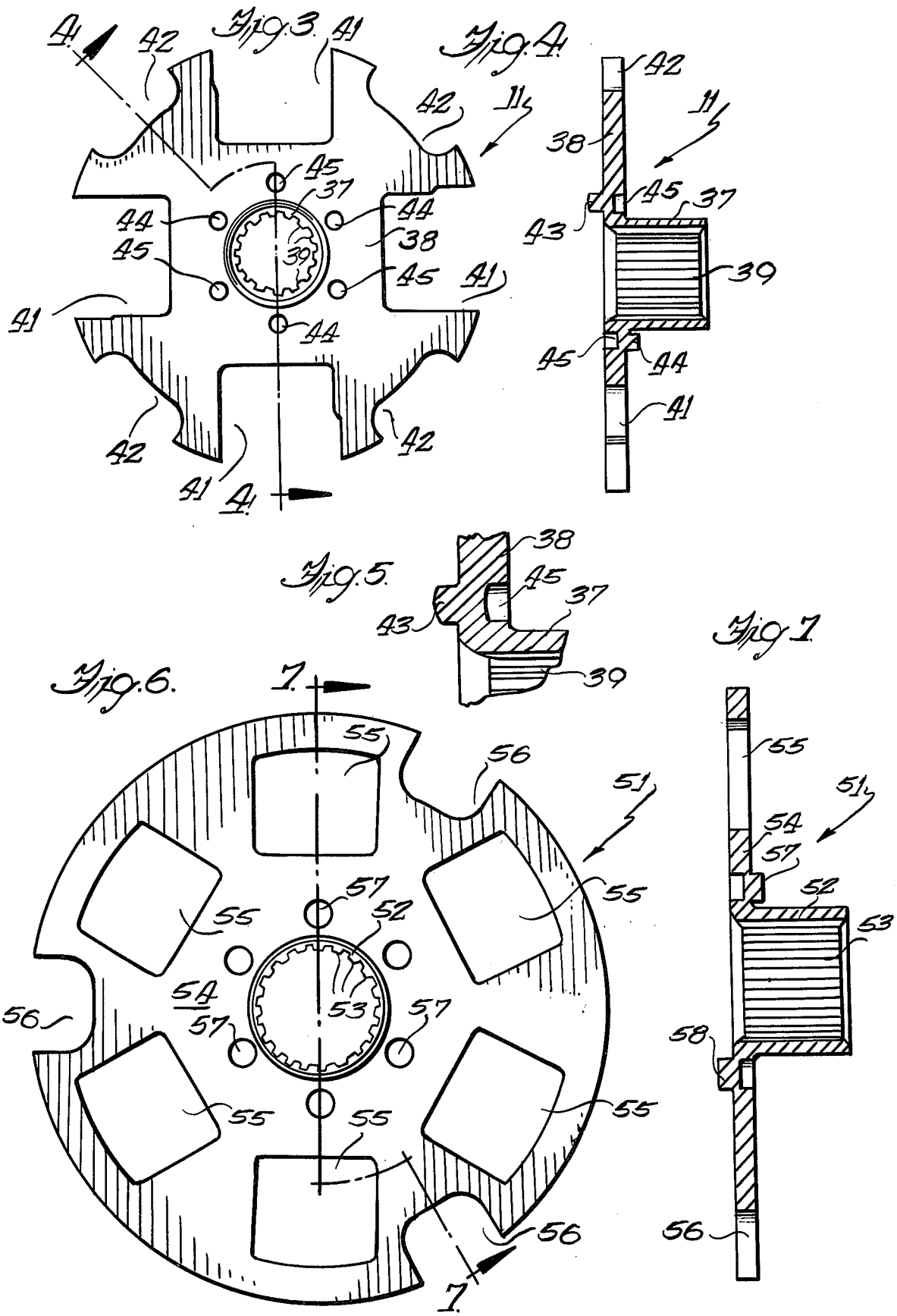

ONE PIECE STAMPED CLUTCH HUB

BACKGROUND AND SUMMARY OF THE INVENTION

Vibration dampers for friction clutch assemblies have been in use for many years for the purpose of neutralizing torsional vibrations emanating from a vehicle engine which would otherwise cause disturbing noises in the transmission and driveline. The vibration damper is utilized in a conventional clutch ahead of a manually operated transmission for an automotive vehicle or may be used where a lock-up clutch is inserted in a torque converter for an automatic transmission.

A vibration damper assembly normally will include an output hub internally splined to an output shaft, a projection or flange extending radially from the hub, and a spring retaining plate and a clutch plate sandwiching the flange. The clutch plate carries the friction surfaces adjacent its outer periphery and is secured to the spring retainer plate by a plurality of rivets extending through arcuate recesses in the outer periphery of the flange. The flange and plates have aligned circumferentially spaced openings therein to receive damper springs which allow limited relative rotation between the hub and the plates. The hub is conventionally a forging and includes shoulders adjacent the flange and barrel machined to provide suitable pilots for the central openings in the plates. The present invention provides an improved vibration damper assembly.

The present invention relates to an improved vibration damper assembly utilizing a one-piece stamped clutch hub in the assembly. The clutch hub is formed with the barrel entirely on one side of the flange without the use of shoulders for pilots to position the spring retainer and clutch plates and any washers sandwiching the flange. Positioning means are formed integral with the flange to pilot the members on each side of the flange.

The present invention also comprehends a one-piece stamped clutch hub and flange for a vibration damper assembly wherein a plurality of projections are formed on each surface of the flange adjacent the barrel of the hub to pilot the plates and washers assembled with the hub and flange to form the damper assembly. A simple die operation acts to form the pilot projections simultaneously on each side of the flange and allows the use of a flat sheet stock for the clutch hub at a considerable saving in cost over other known designs.

Further objects are to provide a construction of maximum simplicity, efficiency, economy and ease of assembly and operation, and such further objects, advantages and capabilities as will later more fully appear and are inherently possessed thereby.

DESCRIPTION OF THE DRAWINGS

FIG. 1 is a front elevational view taken from the right-hand side of FIG. 2 of a vibration damper assembly utilizing a one-piece stamped clutch hub.

FIG. 2 is a vertical cross sectional view of the vibration damper assembly taken on the irregular line 2—2 of FIG. 1.

FIG. 3 is a front elevational view of the one-piece stamped clutch hub of FIG. 1.

FIG. 4 is a vertical cross sectional view taken on the irregular line 4—4 of FIG. 3.

FIG. 5 is an enlarged partial cross sectional view of a pilot projection.

FIG. 6 is a front elevational view of an alternate embodiment of stamped clutch hub.

FIG. 7 is a vertical cross sectional view taken on the irregular line 7—7 of FIG. 6.

DESCRIPTION OF THE PREFERRED EMBODIMENTS

Referring more particularly to the disclosure in the drawings wherein are shown illustrative embodiments of the present invention, FIGS. 1 and 2 disclose a vibration damper assembly 10 for use in a clutch assembly for an automotive vehicle or in other industrial products. The assembly includes a one-piece stamped clutch hub 11, a generally circular spring retainer plate 12, a driven plate 13 and one or more annular washers and/or friction springs 14.

The spring retainer plate 12 is generally circular with a central opening 15 therethrough and has four circumferentially spaced spring pockets 16; each pocket having opposite end walls 17, 17, an outwardly and upwardly curved inner lip 18, and an outwardly and downwardly curved arcuate outer lip 19. Interposed between each pair of adjacent pockets is an opening 21 to receive a shoulder or stop pin 22 which extends between and secures the plates 12 and 13 together.

The driven plate 13 also is generally circular with a central opening 23, a plurality of spring pockets 24 of the same number and aligned with the pockets 16 in the plate 12, openings 25 to receive the shoulder or stop pins 22, and a plurality of openings 26, 26' at the periphery of the plate. Each spring pocket 24 includes opposite end walls 27, 27, an upwardly and outwardly curved inner lip 28 and a downwardly and outwardly curved outer arcuate lip 29. The openings 26' located at spaced intervals in the series of openings 26 are slotted at 31. A plurality of circumferentially spaced radially outwardly extending spring cushions 32 are riveted to the outer periphery of the disc or plate 13 by rivets 33 received in some or all of the openings 26, with the exception of the openings 26'. Additional rivets 34 may be positioned in one or more of the openings 26' to balance the assembly for use in a clutch. The cushions 32 in turn carry generally annular friction facings 35 on the opposite sides thereof adapted to be positioned between driving members in a conventional clutching manner. The facings 35 are suitably secured to the cushions 32 by rivets 36.

The one-piece clutch hub 11 is stamped from flat sheet stock, such as Republic Maxi-Form 50 sheet steel, with a barrel 37 formed entirely on one side of an integral radially outwardly extending spring-abutting flange 38; the hub having internal splines 39 for an operative connection to a driven shaft (not shown). As more clearly seen in FIGS. 3 and 4, the flange 38 is provided with four circumferentially equally spaced spring windows comprising recesses or pockets 41 opening into the periphery of the plate that are adatped to be in alignment with the spring pockets 16 and 24 of the plates 12 and 13, respectively. Interposed between each adjacent spring recess is a shallower recess 42 opening into the plate periphery and adapted to be aligned with the stop pins 22.

Adjacent the barrel of the hub 37 are formed a plurality of piloting means comprising pilot projections 43, 44, with the alternate projections extending from the opposite sides of the flange 38. As shown, there are three projections or bosses 43 extending from the left-side, as seen in FIG. 4, of the flange and three projections or bosses 44 extending from the barrel side of the flange. These projections are extruded in the flange during the stamping operations forming the hub, with the recesses 45 behind the projections 43, 44 formed as the projections are extruded. The projections are utilized to pilot the spacers and/or spring washers 14 to maintain the concentricity between the hub and washers, and the spring retainer plate 12 and the driven plate 13 may also be piloted in the same manner to preserve the concentricity thereof. However, alternatively, the openings 15 and 23 in the plates may be given a small amount of clearance relative to the projections to allow the plates to pilot themselves relative to the hub by the way of the four damper springs 46 received in the aligned spring pockets 16, 41 and 24.

To assemble the vibration damper 10, the spacers and/or spring washers 14 are piloted onto the projections 43, 44 on each side of the flange 38, the spring retainer plate 12 is positioned over the barrel 37 of the hub 11, and the damper springs 46 are positioned in the recesses 41 in the flange and the spring pockets 16 in the plate 12. The stop pins 22 are located in the recesses 42 and project into the openings 21, and the driven plate 13 is positioned on the opposite side of the flange with the spring pockets 24 receiving the springs 46 and the openings 25 receiving the other ends of the pins 22. The opposite ends of the stop pins 22 are then headed as at 47 to retain the assembly together.

In use, the assembly 10 is positioned within a conventional clutch arrangement between a fly wheel and a pressure plate and with the barrel 37 of the hub 11 operatively connected via the splines 39 with the splined end of a driven shaft. The damper springs 46 act to allow but limited relative rotation between the connected plates 12 and 13 and the barrel 37 and flange 38 when the clutch is engaged. The recesses 42 in the flange 38 cooperate with the stop pins 22 to limit the extent of arcuate movement of the plates relative to the hub. The vibration damper operates in a conventional manner as known from prior damper assemblies.

FIGS. 6 and 7 disclose an alternate embodiment of hub 51 having a barrel 52 extending entirely from one side of a flange 54 integral therewith, the barrel having a plurality of internal splines 53. The flange 54 is larger in its radial dimension than the flange 38 of the hub 11 and is provided with a plurality (shown as six in number) of spring windows 55 circumferentially spaced therein. Also, a plurality of recesses 56 are provided in equally spaced relation in the periphery of the flange. The recesses are shown as three in number and are positioned between adjacent pairs of spring windows 55.

As in the previous embodiment, three bosses or projections 57 are extruded from the barrel side of the flange 54 and three bosses 58 are extruded from the opposite side of the flange. The assembly and operation of a vibration damper utilizing this hub 51 are substantially identical to that described for the first embodiment.

While only three round projections or bosses are shown projecting from each side of the flange on the hub, obviously any convenient number of bosses and/or other shapes for the bosses may be utilized for this structure without departing from the spirit or intent of the present invention.

I claim:

1. A one-piece stamped hub element for a clutch plate assembly having coil springs mounted between such element and its driven plate assembly, comprising a hub barrel and an integral spring-abutting flange, said barrel extending entirely from one side of the flange, said flange having spring windows receiving said coil springs, and piloting means on said flange for rotatably guiding elements of the clutch plate assembly comprising a plurality of circumferentially spaced bosses arranged in a circular path about the barrel axis and extending from at least one side of the flange closely adjacent to said barrel.

2. A one-piece stamped hub element as set forth in claim 1, in which said bosses are extruded from the flange during a stamping operation to form the hub element and project from the opposite surfaces of the flange.

3. A one-piece stamped hub element as set forth in claim 2, in which alternate bosses project from the opposite surfaces of said flange.

4. A one-piece stamped hub element as set forth in claim 1, in which the spring windows open into the periphery of the flange and are generally equally circumferentially spaced, and a plurality of recesses opening into the flange periphery between said windows to receive motion limiting means in the driven plate assembly.

5. A one-piece stamped hub element as set forth in claim 1, in which said spring windows are substantially equally circumferentially spaced and located inwardly of the flange periphery, and a plurality of recesses in the flange periphery generally equally circumferentially spaced thereon and adapted to receive motion limiting means of the drive plate assembly.

6. A clutch plate assembly including a one-piece stamped hub element, a spring retainer plate and a driven plate carrying friction surfaces adjacent the periphery thereof, the hub element having a central barrel and an integral radial flange located between said plates, spring washers and/or spacers positioned between said flange and each plate, each plate having a central opening therein, coil springs mounted between said hub element and said plates, and piloting means on said hub element to position said spring washers, spacers and/or plates in concentricity with said hub element comprising a plurality of bosses circumferentially spaced and arranged in a circular path about the barrel axis and projecting from each side of said flange adjacent said barrel.

7. A clutch plate assembly as set forth in claim 6, in which said bosses rotatably guide the spring retainer plate and driven plate relative to said hub element.

8. A clutch plate assembly as set forth in claim 6, in which said bosses are extruded in said flange during a stamping operation to form the hub element.

9. A clutch plate assembly as set forth in claim 6, including aligned spring pockets in said plates and flange to receive said coil springs.

10. A clutch plate assembly as set forth in claim 9, including a plurality of stop pins securing said plates together, said flange having peripheral recesses receiving said stop pins therein to limit relative motion between said hub element and said plates.

* * * * *